US011839913B2

(12) United States Patent
Lafay

(10) Patent No.: US 11,839,913 B2
(45) Date of Patent: Dec. 12, 2023

(54) BINDER SYSTEMS

(71) Applicant: IMERYS USA, INC., Roswell, GA (US)

(72) Inventor: Victor S. Lafay, Cincinnati, OH (US)

(73) Assignee: IMERYS USA, INC., Roswell, GA (US)

( * ) Notice: Subject to any disclaimer, the term of this patent is extended or adjusted under 35 U.S.C. 154(b) by 486 days.

(21) Appl. No.: 16/946,086

(22) PCT Filed: Dec. 7, 2018

(86) PCT No.: PCT/US2018/064429
§ 371 (c)(1),
(2) Date: Jun. 5, 2020

(87) PCT Pub. No.: WO2019/113421
PCT Pub. Date: Jun. 13, 2019

(65) Prior Publication Data
US 2020/0376540 A1    Dec. 3, 2020

Related U.S. Application Data

(60) Provisional application No. 62/596,345, filed on Dec. 8, 2017.

(51) Int. Cl.
| | |
|---|---|
| *C08K 3/36* | (2006.01) |
| *B22C 1/16* | (2006.01) |
| *B22C 1/22* | (2006.01) |
| *B22C 1/26* | (2006.01) |
| *C08G 18/08* | (2006.01) |
| *C08G 18/64* | (2006.01) |
| *C08G 18/76* | (2006.01) |

(52) U.S. Cl.
CPC ............ *B22C 1/167* (2013.01); *B22C 1/2273* (2013.01); *B22C 1/26* (2013.01); *C08G 18/08* (2013.01); *C08G 18/6492* (2013.01); *C08G 18/7671* (2013.01); *C08K 3/36* (2013.01)

(58) Field of Classification Search
CPC .... C08G 18/16; C08G 18/18; C08G 18/6492; C08K 3/36
See application file for complete search history.

(56) References Cited

U.S. PATENT DOCUMENTS

| | | | | |
|---|---|---|---|---|
| 5,138,014 A | * | 8/1992 | Katano | ................. C08G 77/50 528/33 |
| 2011/0190444 A1 | | 8/2011 | Thiel | |
| 2011/0220316 A1 | | 9/2011 | Fuqua et al. | |
| 2016/0369080 A1 | * | 12/2016 | Crocco | ................ C08K 11/005 |

FOREIGN PATENT DOCUMENTS

| | | | |
|---|---|---|---|
| WO | WO-2017-165536 A1 | | 9/2017 |
| WO | WO-2017165536 A1 | * | 9/2017 ............. B22C 1/181 |

OTHER PUBLICATIONS

Van Der Flier-Keller E, et al. "Relationships between inorganic constituents and organic matter in a northern Ontario ignite," Fuel, 1988, vol. 67 pp. 1048-1052.
Supplementary European Search Report dated Jul. 19, 2021, in European Patent Application No. 18887015.8 (11 pages).
International Search Report dated Feb. 14, 2019, in International Application No. PCT/US2018/064429 (2 pgs.).

* cited by examiner

*Primary Examiner* — Michael L Leonard
(74) *Attorney, Agent, or Firm* — FINNEGAN, HENDERSON, FARABOW, GARRETT & DUNNER LLP

(57) ABSTRACT

The present disclosure includes binder systems for making foundry articles. The binder systems may comprise a humic substance-containing component that comprise lignite, an isocyanate component, and a catalyst component. The binder systems may be mixed with an aggregate (e.g., sand) for making foundry articles such as molds and cores. Also disclosed herein are methods of making foundry articles using the binder systems.

21 Claims, No Drawings

BINDER SYSTEMS

CLAIM FOR PRIORITY

This application is a U.S. national phase entry under 35 U.S.C. § 371 from PCT International Application No. PCT/US2018/064429, filed Dec. 7, 2018, which claims the benefit of priority of U.S. Provisional Patent Application No. 62/596,345, filed Dec. 8, 2017, from both of which this application claims priority and both of which are incorporated herein by reference.

TECHNICAL FIELD

Embodiments of the present disclosure relate generally to binder systems, e.g., for making foundry articles, and methods of making thereof.

BACKGROUND

Casting is a foundry process for preparing articles in which a heated liquid material, often a metal or metal alloy, is poured into a foundry article (e.g., into the cavity of a mold or around a core) and allowed to cool in the shape of the foundry article. The casted metal article is then released. Foundry articles are typically made from a foundry mixture, e.g., of an aggregate and a binder, which is then cured.

Binder systems often contain an organic solvent that can pose health hazards. Such organic solvents can include formaldehyde and/or phenol, which may be undesirable in some applications. Additionally, when mixed with an aggregate such as sand to form a foundry mix, binder system components can react prematurely, prior to curing. This reaction may impair the ability to shape the foundry mixture into molds and cores. Further, the disadvantages of the binder systems can result in foundry articles with insufficient strength and casted materials of poor quality.

SUMMARY

The present disclosure includes binder systems for making foundry articles. In some examples, the binder systems may comprise a first component comprising lignite, at least one silicate mineral, and at least one polyol, wherein the at least one silicate mineral may comprise at least 5% by weight silica with respect to the total weight of the first component; a second component comprising at least one isocyanate; and a third component comprising at least one catalyst. In some cases, the system may comprise from about 5% to about 65% by weight of the first component with respect to the total weight of the system. In at least one example, the lignite and the at least one silicate mineral may be obtained from a natural mineral deposit. In at least one example, the first component may have a loss on ignition (LOI) value ranging from about 50% to about 70%. In some examples, the first component, the second component, and the third component may be capable of polymerization. In at least one example, the binder system may be substantially free of phenol, formaldehyde, or both phenol and formaldehyde.

In some examples, the first component may comprise at least 10% by weight of the at least one silicate mineral with respect to the total weight of the first component. For example, the at least one silicate mineral may comprise at least 2% by weight alumina with respect to the total weight of the first component, in some examples, the first component may comprise less than 60% by weight humic acid with respect to the total weight of the first component. In some examples, the first component may comprise from about 10% to about 30% by weight humic acid with respect to the total weight of the first component. In some cases, the at least one silicate mineral may further comprise kaolinite, mica, or a combination thereof. In some examples, the at least one silicate mineral may comprise ball clay, kaolin clay, or a combination thereof. In some examples, the system may comprise from about 5% to about 65% by weight of the lignite with respect to the total weight of the system.

According to some aspects of the present disclosure, the system may comprise from about 1% to about 60% by weight of the at least one polyol with respect to the total weight of the system. For example, the at least one polyol may comprise ethylene 1,2-propylene glycol, 1,3-propylene glycol, hexane 1,6-diol, 2 methyl-1,3 propanediol, glycerol, mannitol, sorbitol, diethylene glycol, triethylene glycol, polyethylene glycol, polypropylene glycol, butylene glycol, dibutylene glycol, polybutylene glycol, or a combination thereof.

In some examples, the second component in the binder systems may comprise from about 10% to about 80% by weight of the at least one isocyanate with respect to the total weight of the system. In some cases, the at least one isocyanate in the second component may comprise 2,4-diisocyanatotoluene, 2,6-diisocyanatotoluene, 4,4'-methylene diphenyl diisocyanate, 2,4-methylene diphenyl diisocyanate, 2,2'-methylene diphenyl diisocyanate, polymeric methylene diphenyl diisocyanate, 1,5-naphthalene diisocyanate, 4,4',4"-triisocyanatotriphenylmethane, bis(3,5-diisocyanato-2-methylphenyl)methane, 1,6-hexamethylene diisocyanate, 3-isocyanatomethyl-3,5,5-trimethylcyclohexyl (isophorone) isocyanate, a derivative thereof, or a combination thereof.

According to some aspects of the present disclosure, the at least one catalyst may comprise a tertiary amine. Alternatively or additionally, the at least one catalyst may comprise phenyl pyridine, pyridine, acridine, 2-methoxypyridine, pyridazine, 3-chloro pyridine, quinoline, N-methyl imidazole, N-ethyl imidazole, 4,4'-dipyridine, 4-phenylpropylpyridine, 1-methylbenzimidazole, 1,4-thiazine, or a combination thereof. In some cases, the at least one catalyst may comprise a gas. Alternatively or additionally, the at least one catalyst may comprise a liquid.

Further disclosed herein include methods of making foundry articles. For example, the methods may comprise: preparing a mixture by combining (1) a first component comprising lignite, at least one silicate mineral, and at least one polyol, wherein the at least one silicate mineral may comprise at least 5% by weight silica with respect to the total weight of the first component; (2) a second component comprising at least one isocyanate; and (3) an aggregate; contacting the mixture with a third component comprising at least one catalyst; and curing the mixture with the at least one catalyst. In at least one example, the aggregate may comprise sand. In some cases, the lignite and the at least one silicate mineral may be obtained from a natural mineral deposit. For example, the natural mineral deposit may be a ball clay deposit or a kaolin clay deposit. In some examples, the first component may be prepared by adding the at least one silicate mineral to a natural source of lignite.

According to some aspects of the present disclosure, the methods may further comprise forming the mixture described above into a shape of a core before contacting the mixture with the third component. In some examples, the at least one catalyst may be a gas, and contacting the mixture with the third component may comprise passing the gas through the shape. Alternatively or additionally, the at least one catalyst may be a liquid. In these cases, the methods may further comprise forming the mixture into a shape of a mold after contacting the mixture with the third component and before curing the mixture.

DETAILED DESCRIPTION

Particular aspects of the present disclosure are described in greater detail below. The terms and definitions provided herein control, if in conflict with terms and/or definitions incorporated by reference.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal."

As used herein, the singular forms "a," "an," and "the" include plural reference unless the context dictates otherwise. The terms "approximately" and "about" refer to being nearly the same as a referenced number or value. As used herein, the terms "approximately" and "about" should be understood to encompass ±5% of a specified amount or value.

The present disclosure includes binder systems, e.g., for making foundry articles. The binder systems may include two or more components to be combined. For example, the systems herein may comprise a first component comprising lignite and one or more minerals and/or polyols; a second component comprising one or more isocyanates; and/or a third component comprising one or more catalysts. Such binder systems may be used to prepare foundry articles such as, e.g., molds and cores.

The binder systems herein may include one or more components. According to some aspects of the present disclosure, one or more of the components in the binder systems may be capable of polymerization, e.g., when combined with other components. In some examples, the binder system may be substantially free of organic solvents such as formaldehyde, phenol, and/or other organic solvents, including aromatic solvents. For example, the binder system comprises less than 0.01% by weight formaldehyde and/or less than 0.01% by weight phenol. In some examples, the binder system is devoid of formaldehyde and phenol. In some examples, the binder system is devoid of volatile organic compounds, such that the binder system is environmentally friendly.

According to some aspects of the present disclosure, the binder system includes a first component that comprises at least one material having polymerizable functional groups such as, e.g., hydroxyl functional groups. The polymerizable material(s) may include, for example, humic materials, monofunctional alcohols (e.g., aliphatic alcohols such as methanol and ethanol) and/or polyols.

The humic materials herein may comprise humic acids, fulvic acids, humin, or any combinations thereof. The humic acids may comprise hydroxyl contents that are sufficient for polymerization. In some examples, the humic acids may be extracted from soil and other solid phase sources using a strong base (e.g., NaOH or KOH). The humic acids may be insoluble at low pH (e.g., pH value about 1) and may be precipitated by adding a strong acid. In at least one example, the humic acids may be precipitated by adjusting its pH to about 1 by hydrogen chloride (HCl).

The humic material may be derived from a variety of organic, mineraloid, and/or mineral sources. In at least one example, the humic material comprises lignite and/or leonardite. Lignite is a combustible brown mineraloid that is generally formed from naturally compressed peat. Lignite may be derived from decaying wood under extreme pressure, for example. Lignite suitable for the binder systems herein may comprise a heterogeneous mixture of compounds, including, but not limited to, oxidized lignite (e.g., leonardite), mine lignin, brown coal, slack lignite (e.g., partially oxidized lignite), or any combinations thereof.

In some examples, the lignite may comprise brown coal, which is brownish-black and has a high inherent moisture content, e.g., about 66%, and high ash content compared with bituminous coal. In some examples, the humic material may comprise leonardite, which is an oxidized form of lignite, e.g., comprising humic acids mixed with various minerals such as gypsum and quartz. In some examples, the first component may comprise humic materials other than lignite or leonardite.

The binder systems herein may comprise humic acids at a level suitable for curing. In some examples, the first component of the binder system comprises less than 80%, less than 70%, less than 60%, less than 55%, less than 50%, less than 45%, less than 40%, less than 35%, less than 30%, less than 25%, less than 20%, less than 15%, or less than 10% by weight humic acids with respect to the total weight of the first component. In some examples, the first component comprises from about 1% to about 80% by weight humic acids, e.g., from about 1% to about 60%, from about 1% to about 50%, from about 10% to about 40%, from about 10% to about 30%, from about 15% to about 25%, from about 15% to about 20%, or from about 10% to about 20% by weight humic acids, with respect to the total weight of the first component.

In at least one example, the first component comprises lignite that contains from about 5% to about 50% by weight humic acids with respect to the total weight of the lignite, such as from about 10% to about 45% by weight, or from about 10% to about 30% by weight. In at least one example, the first component may comprise lignite that comprises from about 15% to about 25% by weight humic acids with respect to the total weight of the lignite.

The amount of humic acids in the humic material (e.g., lignite) may be measured according to the California Department of Food and Agriculture (CDFA) method or by the method of Lamar et al. (*J. AOAC Int.*, vol. 97, pp. 721-730, 2014).

In some examples, the binder system may comprise from about 1% to about 80% by weight of lignite with respective to the total weight of the binder system. For example, the binder system may comprise from about 5% to about 70%, from about 5% to about 65%, from about 10% to about 60%, from about 20% to about 50%, from about 1% to about 20%, from about 10% to about 30%, from about 20% to about 40%, from about 30% to about 50%, from about 40% to about 60%, from about 50% to about 70%, or from about 60% to about 80% by weight of lignite with respective to the total weight of the binder system.

The first component herein may further comprise one or more minerals such as, e.g., one or more minerals present in a natural clay such as a kaolinitic clay (e.g., ball clay, kaolin clay, etc.). Examples of minerals suitable for the binder systems herein include, but are not limited to, silica (e.g., quartz), alumina, kaolinite, mica, iron(III) oxide, iron(II) oxide, titanium dioxide, calcium oxide, magnesium oxide, and any combinations thereof.

In some examples, the first component may comprise at least 5%, at least 10%, at least 15%, at least 20%, at least 30%, at least 40%, or at least 50% by weight of the mineral(s) with respect to the total weight of the first component. For example, the first component may comprise from about 1% to about 50% by weight, e.g., from about 1% to about 10%, from about 5% to about 15%, from about 10% to about 20%, from about 15% to about 25%, from about 20% to about 30%, from about 25% to about 35%, or from about 30% to about 40% by weight of the mineral(s) with respect to the total weight of the first component.

According to some aspects of the present disclosure, the mineral(s) comprise silica and/or alumina. For example, the first component may comprise at least 1% by weight silica, e.g., at least 3%, at least 5%, at least 6%, at least 7%, at least 8%, at least 9%, at least 10%, at least 15%, at least 20%, at least 30%, at least 40%, or at least 50% by weight silica with respect to the total weight of the first component. For example, the first component may comprise from about 1% to about 60% by weight silica, e.g., from about 1% to about 10%, from about 5% to about 15%, from about 7% to about 18%, from about 10% to about 20%, from about 15% to about 25%, from about 20% to about 30%, from about 25% to about 35%, or from about 30% to about 40% by weight silica with respect to the total weight of the first component.

Additionally or alternatively, the first component may comprise at least 1% by weight alumina, e.g., at least 2%, at least 3%, at least 4%, at least 5%, at least 6%, at least 7%, at least 8%, at least 9%, at least 10%, at least 15%, at least 20%, or at least 30% by weight alumina with respect to the total weight of the first component. For example, the first component may comprise from about 1% to about 50% by weight alumina, e.g., from about 2% to about 10%, from about 3% to about 5%, from about 3% to about 20%, from about 15% to about 25%, or from about 20% to about 30% by weight alumina with respect to the total weight of the first component.

In some examples, the humic material(s) and the mineral(s) of the first component may be obtained from the same natural source, e.g., the same natural lignite or mineral deposit. For example, the first component may comprise lignite and minerals obtained from a natural deposit that contains both lignite and clay minerals. For example, a lignite deposit may be adjacent to, overlay, or underlay a natural mineral deposit, such as, for example, a ball clay deposit or kaolin clay deposit. The loss on ignition (LOI) value of the natural mineral deposit may provide an indication of the amount of organic material present in the deposit. The LOI value refers to the difference in weight of a material before and after being heated at a high temperature ("igniting" the material). In some examples, the natural deposit may have a LOI value ranging from about 30% to about 90%, e.g., from about 40% to about 80%, from about 50% to about 70%, from about 40% to about 60%, or from about 60% to about 80%. In at least one example, the first component comprises a natural mineral deposit that contains lignite, the natural deposit having a LOI value ranging from about 50% to about 70%.

Alternatively or additionally, the humic material(s) and mineral(s) of the first component may be obtained from different sources, e.g., different natural deposits. For example, the mineral(s) may be obtained from a kaolin deposit and mixed with lignite obtained separately.

According to some aspects, the presence of the mineral component can serve to stabilize aqueous suspensions of the humic material(s) and/or lignite in the absence of added dispersants. Such suspensions can have a higher stability that suspensions derived from other humic material(s) and/or lignite having a lower mineral content, such as for example lignite deposits associated with coal deposits.

According to some aspects of the present disclosure, the first component further comprises one or more polyols. The term polyol refers to an organic compound having at least two hydroxyl groups. The one or more of the polyols may be present in the humic material(s) (e.g., polyol components of humic acids included in lignite) and/or may be separate compounds.

Examples of polyols suitable for the binder systems herein include, but are not limited to, ethylene glycol, 1,2-propylene glycol, 1,3-propylene glycol, hexane 1,6-diol, 2 methyl-1,3-propanediol, glycerol, mannitol, sorbitol, diethylene glycol, triethylene polyethylene glycol, polypropylene glycol, butylene glycol, dibutylene glycol, polybutylene glycol, and any combinations thereof.

The binder systems herein may further comprise one or more solvents. In some examples, the first component may comprise at least one solvent, which may react with other components in the binder system. Exemplary solvents include, but are not limited to, alcohols (including non-lignite polyols), propylene carbonate, and butylene carbonate, among other possible solvents.

According to some aspects of the present disclosure, the binder system may comprise from about 1% to about 80% by weight of the first component relative to the total weight of the binder system, such as, e.g., from about 1% to about 70%, from about 5% to about 65%, from about 5% to about 25%, from about 20% to about 40%, from about 35% to about 55%, or from about 50% to about 70% by weight of the first component with respect to the total weight of the binder system, the first component comprising at least one humic material (e.g., lignite), at least one mineral, and at least one polyol.

In at least one example, the binder system comprises from about 5% to about 75% by weight lignite with respect to the total weight of the binder system, such as from about 5% to about 65% by weight, from about 10% to about 60% by weight, or from about 15% to about 55% by weight lignite. In at least one example, the binder system comprises from about 5% to about 65% by weight lignite with respect to the total weight of the binder system. Additionally or alternatively, the binder system may comprise from about 1% to about 70% by weight polyols) with respect to the total weight of the binder system, such as, e.g., from about 1% to about 60%, from about 1% to about 50%, from about 1% to about 20%, from about 10% to about 30%, from about 20% to about 40%, from about 30% to about 50%, from about 40% to about 60%, from about 50% to about 70%, or from about 60% to about 80% by weight of the polyol(s) with respect to the total weight of the binder system. In at least one example, the binder system comprises from about 1% to about 60% by weight polyol(s) with respect to the total weight of the binder system.

The binder systems herein may further comprise at least one isocyanate, e.g., in another component of the binder system. The isocyanate(s) may serve as suitable building blocks in polyurethane chemistry. Suitable isocyanates include aromatic, aliphatic, and cycloaliphatic polyisocyanates having at least two active isocyanate groups per molecule. According to some aspects of the present disclosure, the binder system may comprise from about 1% to about 90% by weight of at least one isocyanate, e.g., from about 10% to about 80%, from about 20% to about 60%, from about 30% to about 50%, from about 1% to about 30%, from about 20% to about 50%, from about 40% to about 70%, or from about 60% to about 90% by weight of the isocyanate(s) with respect to the total weight of the binder system.

Examples of isocyanates suitable for the binder systems herein include, but are not limited to, "Mondur 541", a commercially available diphenylmethane diisocyanate, a polyisocyanate (produced by Covestro AG), Rubinate® 1780, a water-compatible polyisocyanate based on diphenylmethane diisocyanate (produced by Huntsman International), 2,4-diisocyanatotoluene, 2,6-diisocyanatotoluene, methylene diphenyl diisocyanates (e.g., 4,4'-methylene diphenyl diisocyanate, 2,4-methylene diphenyl diisocyanate, and 2,2'-methylene diphenyl diisocyanate), polymeric methylene diphenyl diisocyanate, 1,5-naphthalene diisocyanate, 4,4',4"-triisocyanatotriphenylmethane, bis(3,5-diisocyanato-2-methylphenyl)methane, 1,6-hexamethylene diisocyanate, 3-isocyanatomethyl-3,5,5-trimethylcyclohexyl (isophorone) isocyanate, any derivatives thereof, and any combinations thereof. The isocyanate(s) may comprise derivatives produced by modifying basic polyisocyanates by bi- or trimerization. For example, such derivatives include, but are not limited to carbodiimides, uretdiones, biurets, allophanates, and any combinations thereof.

The binder systems herein may further comprise at least one catalyst, e.g., in another component of the binder system. In some examples, the catalyst(s) may comprise a gas. Alternatively or additionally, the catalyst(s) may comprise a liquid. The catalysts may facilitate curing of the binder systems, e.g., for use in foundry applications.

According to some aspects of the present disclosure, the catalyst(s) may comprise an amine. In at least one example, the catalyst(s) may comprise a tertiary amine. In some examples, the catalyst(s) may comprise a liquid amine. A suitable liquid amine catalyst for use herein may be a base having a $pK_b$ value ranging from about 7 to about 11. The term "liquid amine" as used herein is meant to include amines which are liquid at ambient temperature or those in solid or gas form which are dissolved in appropriate solvents. The $pK_b$ value may be the negative logarithm of the dissociation constant of the base and is a measure of the basicity of a basic material. The higher this number is, the weaker the base. The bases falling within this range are generally organic compounds containing one or more nitrogen atoms. Examples of the catalysts include, but are not limited to, 4-alkyl pyridines wherein the alkyl group has from one to four carbon atoms, isoquinoline, arylpyridines such as phenyl pyridine, pyridine, acridine, 2-methoxypyridine, pyridazine, 3-chloro pyridine, quinoline, N-methyl imidazole, N-ethyl imidazole, 4,4'-dipyridine, 4-phenyipropylpyridine, 1-methylbenzimidazole, and 1,4-thiazine. In some examples, the liquid tertiary amine catalyst may be an aliphatic tertiary amine, such as, for example, tris(3-dimethylamino) propylamine.

In view of the varying catalytic activity and varying catalytic effect desired, catalyst concentrations in the binder systems may vary. In general, the lower a catalyst's $pK_b$ value is, the shorter will be the work time of the composition and the faster, more complete will be the cure. Work time as used herein refers to the interval of time between mixing the polyisocyanate, lignite, and catalyst(s), and the time when the foundry shape reaches a level of 45 on the Green Hardness "B" Scale Gauge sold by Harry W. Dietert Co., Detroit, Mich.

According to some examples herein, the binder system may comprise from about 0.1% to about 99% by weight of the at least one catalyst with respect to the total weight of the binder system, such as, e.g., from about 0.1% to about 95%, from about 0.1% to about 90%, from about 0.2% to about 80%, from about 0.1% to about 20%, from about 1% to about 30%, from about 10% to about 40%, from about 20% to about 50%, from about 30% to about 60%, from about 40% to about 70%, from about 50% to about 80%, from about 60% to about 90%, or from about 70% to about 99% by weight with respective to the total weight of the binder system.

In some examples, the amount of catalyst(s) may be adjusted to provide a work time for the foundry mixture, the work time ranging from about 1 minute to about 30 minutes, e.g., from about 2 minutes to 20 minutes, from about 1 minutes to about 10 minutes, from about 4 minutes to about 10 minutes, from about 5 minutes to about 15 minutes, from about 10 minutes to about 20 minutes, from about 15 minutes to about 25 minutes, or from about 20 minutes to about 30 minutes.

Alternatively or additionally, the amount of catalyst(s) may be adjusted to provide a strip time ranging from about 1 minute to about 30 minutes, e.g., from about 2 minutes to 20 minutes, from about 1 minute to about 10 minutes, from about 4 minutes to about 10 minutes, from about 5 minutes to about 15 minutes, from about 10 minutes to about 20 minutes, from about 15 minutes to about 25 minutes, or from about 20 minutes to about 30 minutes. Strip time as used herein refers to the interval of time between mixing the isocyanate(s), polyol(s), and catalyst(s) and the time when the foundry article reaches a level of 90 on the Green Hardness "B" Scale Gauge.

As mentioned above, the binder systems may further comprise one or more solvents. For example, the binder system may comprise one or more solvents capable of reacting with isocyanates, such as, for example, alcohols and non-lignite polyols. Alternatively or additionally, the binder system may comprise one or more solvents that are non-reactive with isocyanates. Examples of such solvents include, but are not limited to, propylene carbonate, butylene carbonate, and the like.

Alternatively or additionally, the binder systems may comprise one or more non-humic substances. The non-humic substances may comprise non-humic polyols as described herein. The non-humic substances may also comprise other molecules that are not polyols. In some examples, the binder systems may comprise from about 1% to about 80%, e.g., from about 1% to about 60%, from about 10% to about 50%, or from about 15% to about 25% by weight non-humic substances with respective to the total weight of the binder systems.

Further disclosed herein are methods of making foundry articles, e.g., from a foundry mixture comprising the one or more components discussed above and a fillers, such as an aggregate, e.g., sand. In general, the components of the hinder systems and filler(s) may be mixed by a mixer, e.g., a high-speed continuous mixer. The resulting mixture may then be placed in a pattern and allowed to cure at ambient temperature. After curing, the self-supporting foundry articles may be removed from the pattern. The foundry articles, e.g., mold halves and/or cores, may be assembled to give a complete mold into which molten metal may be poured. On cooling, a metal casting having the shape of the mold may be produced.

In some examples, the methods of making foundry articles may comprise producing a mixture by mixing one or more components, e.g., for making a binder system. The methods may further comprise forming the mixture into a shape of a mold for making foundry articles. The mixture may be made by combining the first component and the isocyanate(s) described herein. In some examples, the first component may be produced by adding one or more minerals to lignite, or by obtaining a sample (e.g., from a natural deposit) that comprises both lignite and one or more minerals, optionally addition one or more polyols other than polyols present in the lignite.

One or more components of the binder systems (e.g., the first component and a second component comprising the isocyanate(s)) may be further combined with one or more fillers. The filler(s) may have any suitable properties, e.g., size, shape, and/or chemical-physical properties, for making foundry articles. Examples of the fillers include, but are not limited to, powder, granular, particulate, fibrous materials, e.g., formed of organic (e.g., wood, cellulose), inorganic materials (e.g., ceramic, silica, glass, mineral), and any combinations thereof.

In some examples, the filler(s) may comprise one or more aggregates. The aggregate(s) may be sufficiently dry so that a workable foundry shape can result after a desired work time and/or a strip time, e.g., a work time ranging from about 3 minutes to about 10 minutes and a strip time ranging from 4 minutes to about 12 minutes. In at least one example, the aggregate(s) comprise sand, which may be natural or synthetic. Exemplary types of sand include, but are not limited to, silica sand, lake sand, chromite sand, and any combinations thereof. In some examples, the sand may comprise at least 60%, at least 70%, at least 80%, at least 85%, or at least 90% by weight silica. Other suitable aggregates include, but are not limited to, zircon, olivine, aluminosilicate, mullite, and any combinations thereof.

According to some aspects of the present disclosure, the amount of the binder system may be less than or equal to about 10% by weight of the aggregate(s), e.g., from about 0.1% to about 10%, from about 0.2% to about 10%, from about 0.2% to about 5%, from about 0.5% to about 2%, from about 0.1% to about 1%, from about 0.5% to about 1.5%, from about 1% to about 2%, from about 1.5% to about 2.5%, from about 2% to about 3%, from about 2.5% to about 3.5%, from about 3% to about 4%, from about 3.5% to about 4.5%, from about 4% to about 5%, from about 5% to about 7%, or from about 6% to about 8% by weight with respect to the weight of the aggregate(s).

The methods of making foundry articles may further comprise adjusting the viscosity of the binder system (e.g., using one or more solvents as described herein). For example, the viscosity of the binder system may be adjusted to suit the aggregate(s). In some examples, the method may comprise adjusting the viscosity of the binder system within a range from about 50 centipoise (cP) to about 400 cP, from about 100 cP to about 300 cP, from about 50 cP to about 150 cP, from about 200 cP to about 300 cP, from about 250 cP to about 350 cP, or from about 300 cP to about 400 cP.

The methods herein may further comprise contacting the mixture (comprising at least lignite or other humic material and one or more mineral(s)) with a component comprising one or more catalysts, and curing the mixture with the catalyst(s). According to some aspects of the present disclosure, the binder system may be made available as a three-part system with the first component (e.g., which may be provided in one package, a second component comprising the isocyanate(s) (e.g., which may be provided in a second package), and a third component comprising the catalyst(s) (e.g., which may be provided in a third package). When making foundry articles, the components of the binder systems may be combined first and then mixed with the aggregate(s). Alternatively, one or more of the components of the binder system may be sequentially mixed with the aggregate(s). In some examples, the first component and the isocyanate(s) may be first mixed with the aggregate(s) and then the catalyst component added. The mixture may contain other ingredients such as, for example, iron oxide, ground flax fibers, wood cereals, pitch, refractory flours, or any combinations thereof.

The binder systems and the methods herein may be used to make foundry articles (e.g., molds and/or cores) in any suitable manner with regard to foundry aggregates, including in a "cold-box" process or "no bake" process. In a cold-box process, a gaseous curing agent may be passed through a compacted shaped mix to produce a cured mold and/or core. In a no bake process, liquid catalysts such as tertiary liquid amines may be used.

In some examples, the method for making foundry articles may be performed by a cold box process. A cold box process may include one or more of: (1) providing the components needed to form a binder system as described herein; (2) mixing the components with an aggregate and then shaping the mixture into a desired core and/or mold in a pattern; (3) curing the shaped mixture by containing with a catalyst (e.g., a gaseous tertiary amine catalyst); and (4) removing the cured product of step (3) from the pattern.

In some examples, in a cold box process, the curing process may performed by passing one or more catalysts (e.g., tertiary amine gas) through the molded mixture such as described in U.S. Pat. No. 3,409,579, which is hereby incorporated by reference in its entirety. Gassing times may be dependent on core weight and geometry, and may range from about 0.5 second to about 30 seconds. Purge times may be dependent on core weight and geometry, and may range from about 1 second to about 60 seconds.

Metal castings may be made by pouring molten metal into and around an assembly of molds and/or cores made with the binder system and aggregate(s). The present disclosure also includes methods of casting a metal using a cold box process. The method may comprise: (1) preparing a foundry core and/or mold as described herein; (2) providing and pouring metal while in the liquid state into and around the core or mold; (3) allowing the metal to cool and solidify; and (4) separating the molded article from the core or mold.

Alternatively or additionally, the methods for making foundry articles may include a no bake process. The methods of making foundry articles using a no bake process may comprise (1) mixing at least the first component, the isocyanate(s), and any solvents together in a composition, (2) adding liquid catalyst in any suitable manner and time (e.g., adding the catalyst to one or more component of the binder system, or adding the catalyst to a combination of components prior to, during, and/or after contacting the binder system with the aggregate); (3) mixing the components of the binder system with an aggregate and then shaping and curing the mixture into a desired core and/or mold in a pattern; and (4) removing the shaped mixture of step (3) from the pattern.

According to some aspects of the present disclosure, the methods of making foundry articles may further comprise adding one or more additives to the binder system. Such additives may improve casting quality. Examples of additives include, but are not limited to, black iron oxide, red iron oxide, clay, wood flour, and any combinations thereof. The additives may also include adhesion promoters that increases tensile strength and improve humidity resistance of the foundry articles. Exemplary adhesion promoters include, but are not limited to, silane coupling agents such as, for example, gamma-ureidopropyltriethoxysilane, and gamma-aminopropyltrimethoxysilane. The additives may also include release agents that facilitate the removal of the foundry articles from mold patterns. Exemplary release agents include, but are not limited to, glycerol trioleate, oleic acid, and a combination thereof. In some examples, coatings may be applied to the cores and/or molds, e.g., for reducing erosion and improve casting finish.

The methods herein may further comprise extending the bench life of the foundry articles. Bench life refers to the time interval between forming the foundry articles and the time when the foundry articles are no longer useful or acceptable as molds and cores. Tensile strength provides a measure of the usefulness of the foundry articles and the acceptability as molds and cores. If a foundry article is used after the bench life has expired, the resulting casted articles may be of low quality. In some examples, the methods for extending the bench life of the foundry articles may comprise adding one or more compounds to the binder systems. Examples of such compounds include, but are not limited to, organic and/or inorganic phosphorus containing compounds.

According to some aspects of the present disclosure, the binder systems may be used in a variety of ways. For example, the binder systems may be used as replacements of phenolic resin (e.g., urethane) systems. In some examples, the binder systems may be used as molding compounds, protective coatings, bonding or adhesive resins (e.g., for use in laminating), coated or bonded abrasives, friction materials, insulation materials, plywood manufacture, and fibrous or granulated wood.

Aspects of the present disclosure are further illustrated by reference to the following exemplary numbered paragraphs.

1. A binder system comprising a first component comprising lignite, at least one silicate mineral, and at least one polyol, wherein the at least one mineral comprises at least 5% by weight silica with respect to the total weight of the first component; a second component comprising at least one isocyanate; and a third component comprising at least one catalyst.

2. The binder system of paragraph 1, wherein the system comprises from about 5% to about 65% by weight of the first component with respect to the total weight of the system.

3. The binder system of paragraph 1 or 2, wherein the first component comprises at least 10% by weight of the at least one silicate mineral with respect to the total weight of the first component.

4. The binder system of any one of paragraphs 1-3, wherein the at least one silicate mineral comprises at least 2% by weight alumina with respect to the total weight of the first component.

5. The binder system of any one of paragraphs 1-4, wherein the first component comprises less than 60% by weight humic acid with respect to the total weight of the first component.

6. The binder system of paragraph 5, wherein the first component comprises from about 10% to about 30% by weight humic acid with respect to the total weight of the first component.

7. The binder system of any one of paragraphs 1-6, wherein the lignite and the at least one silicate mineral are obtained from a natural mineral deposit.

8. The binder system of any one of paragraphs 1-7, wherein the at least one silicate mineral further comprises kaolinite, mica, or a combination thereof.

9. The binder system of any one of paragraphs 1-8, wherein the at least one silicate mineral comprises ball clay, kaolin clay, or a combination thereof.

10. The binder system of any one of paragraphs 1-9, wherein the first component has a loss on ignition (LOI) value ranging from about 50% to about 70%.

11. The binder system of any one of paragraphs 1-10, wherein the system comprises from about 5% to about 65% by weight of the lignite with respect to the total weight of the system.

12. The binder system of any one of paragraphs 1-11, wherein the system comprises from about 1% to about 60% by weight of the at least one polyol with respect to the total weight of the system.

13. The binder system of any one of paragraphs 1-12, wherein the at least one polyol comprises ethylene glycol, 1,2-propylene glycol, 1,3-propylene glycol, hexane 1,6-diol, 2 methyl-1,3-propanediol, glycerol, mannitol, sorbitol, diethylene glycol, triethylene glycol, polyethylene glycol, polypropylene glycol, butylene glycol, dibutylene glycol, polybutylene glycol, or a combination thereof.

14. The binder system of any one of paragraphs 1-13, wherein the second component comprises from about 10% to about 80% by weight of the at least one isocyanate with respect to the total weight of the system.

15. The binder system of any one of paragraphs 1-44, wherein the at least one isocyanate comprises 2,4-diisocyanatotoluene, 2,6-diisocyanatotoluene, 4,4'-methylene diphenyl diisocyanate, 2,4-methylene diphenyl diisocyanate, 2,2'-methylene diphenyl diisocyanate, polymeric methylene diphenyl diisocyanate, 1,5-naphthalene diisocyanate, 4,4', 4"-triisocyanatotriphenylmethane, bis(3,5-diisocyanato-2-methylphenyl)methane, 1,6-hexamethylene diisocyanate, 3-isocyanatomethyl-3,5,5-trimethylcyclohexyl(isophorone) isocyanate, a derivative thereof, or a combination thereof.

16. The binder system of any one of paragraphs 1-15, wherein the at least one catalyst comprises a tertiary amine.

17. The binder system of any one of paragraphs 1-16, wherein the at least one catalyst comprises phenyl pyridine, pyridine, acridine, 2-methoxypyridine, pyridazine, 3-chloro pyridine, quinoline, N-methyl imidazole, N-ethyl imidazole, 4,4'-dipyridine, 4-phenylpropylpyridine, 1-methylbenzimidazole, 1,4-thiazine, or a combination thereof.

18. The binder system of any one of paragraphs 1-17, wherein the at least one catalyst comprises a gas.

19. The binder system of any one of paragraphs 1-17, wherein the at least one catalyst comprises a liquid.

20. The binder system of any one of paragraphs 1-19, wherein the first component, the second component, and the third component are capable of polymerization.

21. The binder system of any one of paragraphs 1-20, wherein the system is substantially free of phenol, formaldehyde, or both phenol and formaldehyde.

22. A foundry article comprising the binder system of any one of paragraphs 1-21.

23. A method of making a foundry article using the binder system of any one of paragraphs 1-21.

24. A method of making a foundry article, the method comprising: preparing a mixture by combining: (1) a first component comprising lignite, at least one silicate mineral, and at least one polyol, wherein the at least one silicate mineral comprises at least 5% by weight silica with respect to the total weight of the first component; (2) a second component comprising at least one isocyanate; and (3) an aggregate; contacting the mixture with a third component comprising at least one catalyst; and curing the mixture with the at least one catalyst.

25. The method of paragraph 24, wherein the lignite and the at least one silicate mineral are obtained from a natural mineral deposit.

26. The method of paragraph 24 or 25, wherein the natural mineral deposit is a ball clay deposit or a kaolin clay deposit.

27. The method of any one of paragraphs 24-26, wherein the first component is prepared by adding the at least one silicate mineral to a natural source of lignite.

28. The method of any one of paragraphs 24-27, wherein the aggregate comprises sand.

29. The method of any one of paragraphs 24-28, further comprising forming the mixture into a shape of a core before contacting the mixture with the third component.

30. The method of any one of paragraphs 24-29, wherein the at least one catalyst is a gas, and contacting the mixture with the third component comprises passing the gas through the shape.

31. The method of any one of paragraphs 24-29, wherein the at least one catalyst is a liquid.

32. The method of any one of paragraphs 24-31, further comprising forming the mixture into a shape of a mold after contacting the mixture with the third component and before curing the mixture.

33. A foundry article made by the method of any one of paragraphs 24-32.

34. Use of the binder system of any one of paragraphs 1-21 for making a foundry article.

The following examples are intended to illustrate the present disclosure without, however, being limiting in nature. It is understood that the present disclosure encompasses additional embodiments consistent with the foregoing description and following examples.

EXAMPLES

Example 1

A sample of lignite was obtained from a natural lignite deposit associated with a ball clay deposit for use in a binder system according to the present disclosure. The results are reported in Table 1 below.

TABLE 1

| Analysis | Units | Results |
| --- | --- | --- |
| Moisture @ 105° C. | Wt % | 19.6 |
| Loss on Ignition 1050° C. | Wt % | 61.6 |
| XRF Chemical Analysis: | | |
| $SiO_2$ | Wt % | 10.4 |
| $Al_2O_3$ | Wt % | 5.0 |
| $Fe_2O_3$ | Wt % | 1.1 |
| S | Wt % | 1.0 |
| CaO | Wt % | 0.4 |
| $TiO_2$ | Wt % | 0.4 |
| MgO | Wt % | 0.2 |
| $K_2O$ | Wt % | 0.1 |
| $Na_2O$ | Wt % | <0.1 |
| $P_2O_5$ | Wt % | <0.1 |

Major element chemistry analysis was conducted on a ThermoARL Advant'X Sequential XRF with Uniquant standardless software and loss on ignition (LOI) normalization (moisture content was included in the normalization). The sample was prepared by pressed pellet preparation with the "as-received" sample, as well as fusion to verify that sulfur content was not associated with mineralogy.

Example 2

A sample of lignite was obtained from a natural lignite deposit for use in a binder system according to the present disclosure. The natural lignite sample of Example 1 was tested for humic acid content according to the CDFA method and the method of Lamar et al. Results are shown in Table 2 below.

TABLE 2

| Material | CDFA method | Lamar et al. |
| --- | --- | --- |
| Humic acid | 20.32% wt. | 41.37% wt. |
| Hydrophobic fulvic acid | — | 11.84% |

The CDFA method disregards fulvic material and uses a slightly less caustic solution than the Lamar et al. (AOAC) method, leading to different results.

Example 3

A binder system is prepared from a component comprising 20% by weight of the lignite/mineral sample of Example 1, 20% by weight water, 20% by weight propylene carbonate, and 40% by weight ethylene glycol. Next, 3 kilograms of a 55 grain fineness number silica sand (as defined by American Foundry Society standard procedure, AFS 1106-00-s) is evenly coated with the component and mixed with a methylene diphenyl diisocyanate/solvent mixture and a tertiary amine catalyst. The mixture is produced using a paddle type mixer. The mixture contains 0.3% (wt %) of the component above, 1.2% (wt %) of the isocyanate/'solvent mixture, and 0.225% (wt %) of the tertiary amine catalyst.

After the sand is coated sufficiently, the mixture is packed into a test coupon mold according to AFS 3342-00-S. Tensile strength of the bonded test coupons is measured according to AFS 3301-00-S at 10 minutes, 1 hour, 3 hours, and 24 hours after the sand cures. Standard permeability and scratch hardness tests are also conducted using AFS 5223-00-S and AFS 3318-00-S.

Other aspects and embodiments of the present disclosure will be apparent to those skilled in the art from consideration of the specification and practice of the embodiments disclosed herein.

It is intended that the specification and examples therein be considered as exemplary only, with a true scope and spirit of the present disclosure being indicated by the following claims.

What is claimed is:

1. A binder system comprising:
   a first component comprising lignite, at least one silicate mineral, and at least one polyol, wherein the at least one silicate mineral comprises 5-25% by weight silica with respect to the total weight of the first component;
   a second component comprising at least one isocyanate; and
   a third component comprising at least one catalyst.

2. The system of claim 1, wherein the system comprises from about 5% to about 65% by weight of the first component with respect to the total weight of the system.

3. The system of claim 1, wherein the first component comprises 10-25% by weight of the at least one silicate mineral with respect to the total weight of the first component.

4. The system of claim 1, wherein the at least one silicate mineral comprises at least 2% by weight alumina with respect of the total weight of the first component.

5. The system of claim 1, wherein the first component comprises less than 60% by weight humic acid with respect to the total weight of the first component.

6. The system of claim 5, wherein the first component comprises from about 10% to about 30% by weight humic acid with respect to the total weight of the first component.

7. The system of claim 1, wherein the lignite and the at least one silicate mineral are obtained from a natural mineral deposit.

8. The system of claim 1, wherein the at least one silicate mineral further comprises kaolinite, mica, or a combination thereof.

9. The system of claim 1, wherein the at least one silicate mineral comprises ball clay, kaolin clay, or a combination thereof.

10. The system of claim 1, wherein the first component has a loss on ignition (LOI) value ranging from about 50% to about 70%.

11. The system of claim 1, wherein the system comprises from about 5% to about 65% by weight of the lignite with respect to the total weight of the system.

12. The system of claim 1, wherein the system comprises from about 1% to about 60% by weight of the at least one polyol with respect to the total weight of the system.

13. The system of claim 1, wherein the at least one polyol comprises ethylene glycol, 1,2-propylene glycol, 1,3-propylene glycol, hexane 1,6-diol, 2 methyl-1,3-propanediol, glycerol, mannitol, sorbitol, diethylene glycol, triethylene glycol, polyethylene glycol, polypropylene glycol, butylene glycol, dibutylene glycol, polybutylene glycol, or a combination thereof.

14. The system of claim 1, wherein the second component comprises from about 10% to about 80% by weight of the at least one isocyanate with respect to the total weight of the system.

15. The system of claim 1, wherein the at least one isocyanate comprises 2,4-diisocyanatotoluene, 2,6-diisocyanatotoluene, 4,4'-methylene diphenyl diisocyanate, 2,4-methylene diphenyl diisocyanate, 2,2'-methylene diphenyl diisocyanate, polymeric methylene diphenyl diisocyanate, 1,5-naphthalene diisocyanate, 4,4',4"-triisocyanatotriphenylmethane, bis(3,5-diisocyanato-2-methylphenyl)methane, 1,6-hexamethylene diisocyanate, 3-isocyanatomethyl-3,5,5-trimethylcyclohexyl(isophorone) isocyanate, a derivative thereof, or a combination thereof.

16. The system of claim 1, wherein the at least one catalyst comprises a tertiary amine.

17. The system of claim 1, wherein the at least one catalyst comprises phenyl pyridine, pyridine, acridine, 2-methoxypyridine, pyridazine, 3-chloro pyridine, quinoline, N-methyl imidazole, N-ethyl imidazole, 4,4'-dipyridine, 4-phenylpropylpyridine, 1-methylbenzimidazole, 1,4-thiazine, or a combination thereof.

18. The system of claim 1, wherein the at least one catalyst comprises a gas.

19. The system of claim 1, wherein the at least one catalyst comprises a liquid.

20. The system of claim 1, wherein the first component, the second component, and the third component are capable of polymerization.

21. The system of claim 1, wherein the system is substantially free of phenol, formaldehyde, or both phenol and formaldehyde.

\* \* \* \* \*